US010021360B2

(12) United States Patent
Peng et al.

(10) Patent No.: US 10,021,360 B2
(45) Date of Patent: Jul. 10, 2018

(54) IMAGE DISPLAYING SYSTEM

(71) Applicant: Shinex Electronic Industries Inc., New Taipei (TW)

(72) Inventors: Kuei-Chi Peng, New Taipei (TW); Kuei-Lin Peng, New Taipei (TW); Chieh-Feng Wu, New Taipei (TW)

(73) Assignee: Shinex Electronic Industries Inc., New Taipei (TW)

( * ) Notice: Subject to any disclaimer, the term of this patent is extended or adjusted under 35 U.S.C. 154(b) by 114 days.

(21) Appl. No.: 15/085,621

(22) Filed: Mar. 30, 2016

(65) Prior Publication Data
US 2017/0104967 A1    Apr. 13, 2017

(30) Foreign Application Priority Data

Oct. 8, 2015 (TW) .............................. 104133257 A

(51) Int. Cl.
*G03B 21/28* (2006.01)
*H04N 9/31* (2006.01)

(52) U.S. Cl.
CPC ......... *H04N 9/3173* (2013.01); *H04N 9/3141* (2013.01); *H04N 9/3185* (2013.01)

(58) Field of Classification Search
CPC .. H04N 9/3173; H04N 9/3185; H04N 9/3141; H04N 9/31; G03B 21/28; G03B 21/14; G03B 21/22; G03B 31/04
USPC ..................................... 353/119, 79; 352/35
See application file for complete search history.

(56) References Cited

U.S. PATENT DOCUMENTS

| 5,285,287 A * | 2/1994 | Shikama | H04N 9/3141 348/745 |
|---|---|---|---|
| 2008/0013053 A1 * | 1/2008 | Anson | G03B 21/14 353/69 |
| 2008/0204668 A1 * | 8/2008 | Dammura | G03B 21/28 353/52 |
| 2011/0263299 A1 * | 10/2011 | Kotani | G03B 21/10 455/566 |
| 2012/0191342 A1 | 7/2012 | Kang et al. | |

* cited by examiner

FOREIGN PATENT DOCUMENTS

TW    20141664 A    11/2014

OTHER PUBLICATIONS

Office Action of corresponding TW application, published on Aug. 24, 2016.

*Primary Examiner* — Steven H Whitesell Gordon
*Assistant Examiner* — Jerry Brooks
(74) *Attorney, Agent, or Firm* — Wang Law Firm, Inc.

(57) ABSTRACT

An image displaying system is provided, including an image device, first and second carrying devices. The image device receives an external image message. The first carrying device has an accommodating space. An imaging assembly is disposed at one end of the first carrying device while a virtual-image imaging assembly is disposed at the opposite end. The second carrying device has a storage space. The image device may attach to the accommodating space. When triggered, the image device transforms the external image message into a reversed image message and then projects the reversed image message to the imaging assembly. The virtual-image imaging assembly projects the reversed image message of the imaging assembly to produce a first image. The image device may attach to the storage space such that it projects the external image message to a target to produce a second image.

8 Claims, 7 Drawing Sheets

IMAGE DISPLAYING SYSTEM

CROSS-REFERENCE TO RELATED APPLICATION

This application claims priority from Taiwan Patent Application No. 104133257, filed on Oct. 8, 2015, in the Taiwan Intellectual Property Office, the content of which is hereby incorporated by reference in their entirety for all purposes.

BACKGROUND OF THE INVENTION

1. Field of the Invention

This application relates to an image displaying system, and more particularly, to an image displaying device which can be detachably and selectively attached to a first carrying device or a second carrying device for image projections.

2. Description of the Related Art

As far as the driving environment is concerned, the driver has to pay attention to the vehicle information such as vehicle speed, radiator water temperature, engine rotational speed, gearshift, and fuel capacity, and so on. The information mentioned above is mostly displayed on the dashboard, which is usually disposed below the windshield in accordance with the vehicle design. Consequently, the driver has to grasp the situations related to the ambient environment and the traffic conditions through the windshield in the process of driving. However, due to the limited field of vision of human, it is inevitable that the driver has to observe the surrounding environment and the traffic conditions through the windshield while paying attention to the vehicle information displayed on the dashboard. Such behavior distracts the driver's focus from the driving, resulting in the increasing risk of car accident.

For the sake of resolving the aforementioned problems, the Head-Up Display Device (HUD) is invented. The term HUD is self-explanatory that it is designed to provide the driver with the driving assistance information such as the vehicle speed, fuel level, and so on without having the driver to look at the dashboard while driving.

Conventionally, the HUD is implemented by disposing a light-emitting display below the windshield, and attaching a reflective film to the windscreen which reflects the information from the light-emitting display to the driver. Nevertheless, the HUD is generally fixed on the vehicle dashboard and only designed to display the driving assistance information such as the vehicle speed, fuel level, and so on.

As a consequence, the inventor of the present disclosure has been mulling over the aforementioned problems and then designs an image displaying system which aims at improving the current shortcomings so as to promote the industrial practicability.

SUMMARY OF THE INVENTION

In view of the foregoing technical problems, one objective of the present disclosure is to provide an image displaying system to resolve the known technical problems.

In accordance with the objective of the present disclosure, an image displaying system is provided, which includes an image device, a first carrying device, and a second carrying device. The image device receives an external image message. One surface of the first carrying device dents inwards to form an accommodating space. The first carrying device includes an imaging assembly pivotally disposed at one end and a virtual-image imaging assembly pivotally disposed at the opposite end. One surface of the second carrying device dents inwards to form a storage space. When the image device is detachably coupled to the accommodating space and triggered, the image device transforms an external image message into a reversed image message and projects the reversed image message to an imaging assembly. The virtual-image imaging assembly then maps the reversed image message of the imaging assembly to produce a first image. When the image device is detachably coupled to the storage space, the image device projects the external image message to a target to produce a second image.

Preferably, when the image device is detachably coupled to the storage space and projects the external image message, a bottom line of a projection range where the image device projects the external image message is parallel to the opposite surface of the second carrying device.

Preferably, the image device includes a device main body, an image assembly, and a control assembly. The image assembly is disposed at one end of the device main body. The control assembly is disposed in the device main body and electrically connected to the image assembly. The control assembly receives the external image message. When the device main body is detachably coupled to the accommodating space and the control assembly is triggered, the control assembly transforms the external image message into the reversed image message and controls the image assembly to project the reversed image message to the imaging assembly, and then the virtual-image imaging assembly maps the reversed image message of the imaging assembly so as to produce the first image. Alternatively, when the device main body is detachably coupled to the storage space, the control assembly controls the image assembly to project the external image message to the target so as to produce the second image.

Preferably, the image device further comprises at least one transmission element disposed at one side of the device main body and electrically connected to the control assembly, and the image device is electrically connected to an external electronic device through the at least one transmission element to receive the external image message.

Preferably, the imaging device further comprises a power component disposed in the device main body and electrically connected to the control assembly and the image assembly, and the power component receives or stores an external power source for supplying the control assembly and the image assembly with power.

Preferably, the first carrying device includes a bearing base, an imaging plane and a display element. One surface of the bearing base dents inwards to form the accommodating space, and one end of the bearing base partially dents inwards and two inner walls at the end of the bearing base respectively form a connecting part. The imaging plane is disposed on one surface of the imaging assembly that faces to the bearing base, the surface of the imaging assembly protrudes outwardly to form an engagement part, and the imaging assembly is pivotally connected to both of the connecting parts through the engagement part. The display element is pivotally disposed on one end of the virtual-image imaging assembly. The other end of the virtual-image imaging assembly is pivotally connected to the bearing base. When the device main body is detachably coupled to the accommodating space and the control assembly is triggered, the control assembly transforms the external image message into the reversed image message and controls the image assembly to project the reversed image message to the imaging plane of the imaging assembly, and then the display element of the virtual-image imaging assembly maps the reversed image message of the imaging plane so as to produce the first image.

Preferably, the first carrying device includes a magnetic element. The control assembly includes a magnetic switch and an image processing unit. The magnetic switch is disposed in the device main body. The image processing unit is electrically connected to the image assembly and the magnetic switch. When the device main body is detachably coupled to the accommodating space, the magnetic switch is triggered by the magnetic element and produces a trigger signal, and the image processing unit transforms the external image message into the reversed image message according to the trigger signal and controls the image assembly to project the reversed image message onto the imaging assembly, and then the virtual-image imaging assembly maps the reversed image message of the imaging assembly so as to produce the first image.

Preferably, for storage, the imaging assembly is able to pivot around the engagement part and the virtual-image imaging assembly is able to pivot around the other end of the bearing base, until the imaging assembly is parallel to the bearing base, and the virtual-image imaging assembly is partially parallel to the bearing base, such that the bearing base, the imaging assembly and the virtual-image imaging assembly enclose the image device.

Preferably, the virtual-image imaging assembly is in an L-shaped structure.

Preferably, the display element is made of a translucent material.

As mentioned previously, an image displaying system in accordance with the present disclosure may have one or more advantages as follows:

1. The image device of the image displaying system of the present disclosure can be selectively disposed on the first carrying device or the second carrying device to display the first image pertaining to the driving assistance information or the messages from the handheld device or the like, or the second image pertaining to internet contents, video, and so on, thereby providing the user with a multifunctional image device.

2. The image device and the first carrying device of the image displaying system of the present disclosure are respectively disposed with the magnetic switch and the magnetic element. The magnetic switch can determine whether the image device is disposed on the first carrying device or the second carrying device by sensing the presence of the magnetic element, consequently decide whether to transform the external image message into the reversed image message or to directly project the external image message. Furthermore, the image device can determine the corresponding information content automatically based on the input of magnetic switch.

DESCRIPTION OF THE PREFERRED EMBODIMENTS

Figure 1:
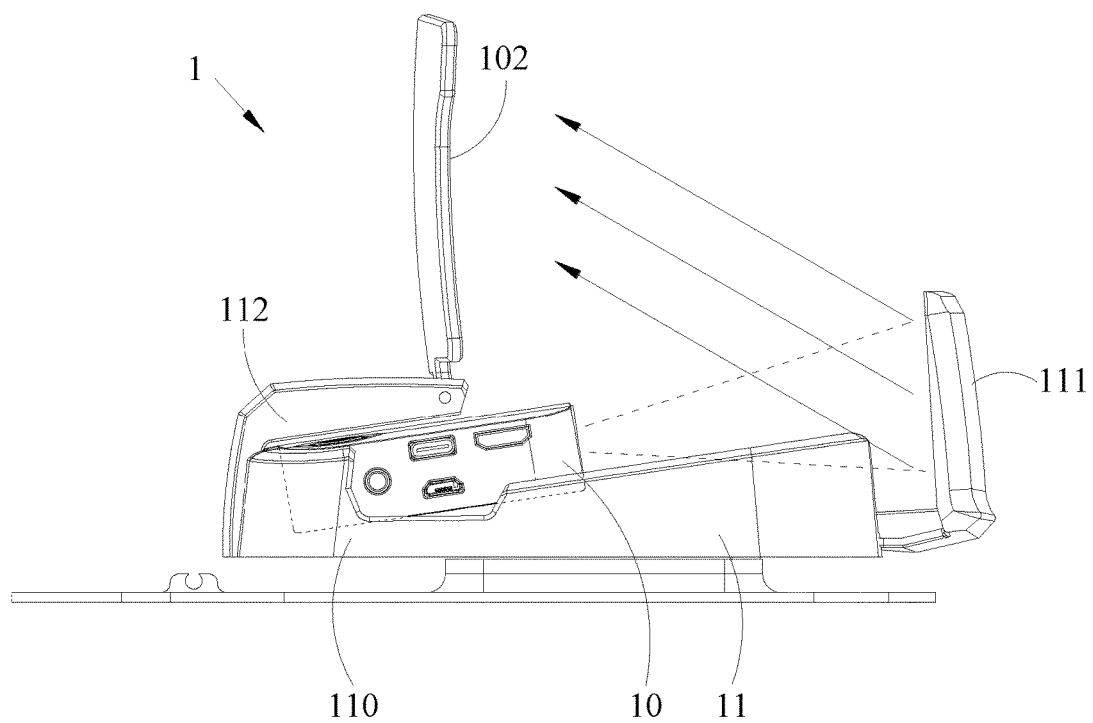
FIG. 1 is a schematic diagram illustrating the first structure of the first embodiment of an image displaying system of the present disclosure.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

For better understanding, like elements are designated by like reference numerals in the accompanying drawings and the following description for the embodiments.

Figure 2:
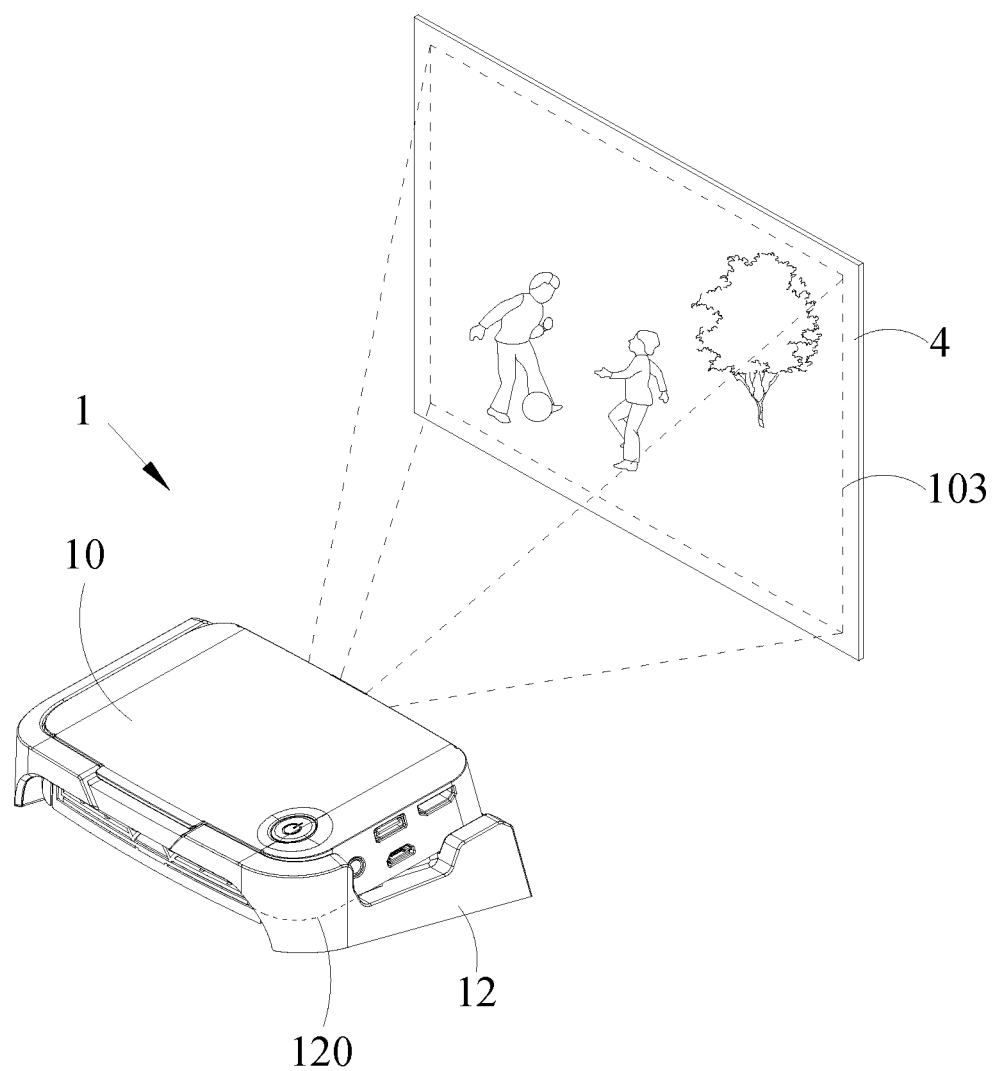
FIG. 2 is a schematic diagram illustrating the second structure of the first embodiment of an image displaying system of the present disclosure.
Figure 3:
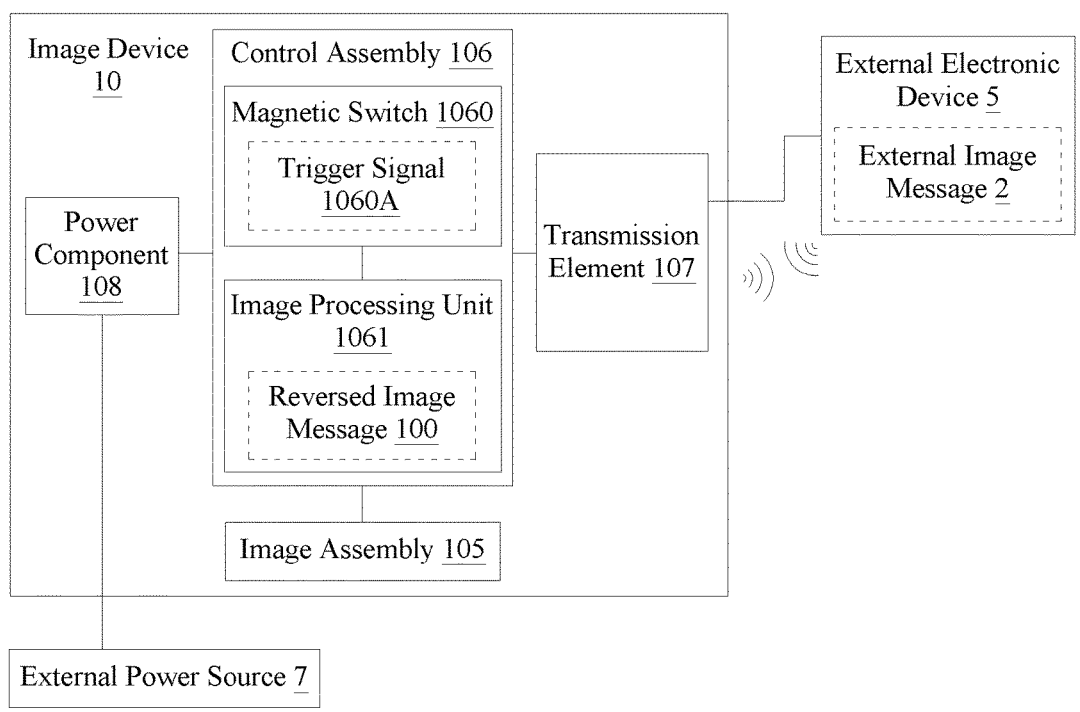
FIG. 3 is a block diagram of the first embodiment of an image displaying system of the present disclosure.

Referring to FIG. 1, FIG. 2 and FIG. 3, which are a schematic diagrams illustrating the first structure of the first embodiment of an image displaying system of the present disclosure, a schematic diagram illustrating the second structure of the first embodiment of an image displaying system of the present disclosure, and a block diagram of the first embodiment of an image displaying system of the present disclosure, respectively. As shown in the figures, an image displaying system 1 includes an image device 10, a first carrying device 11, and a second carrying device 12. The image device 10 receives an external image message 2. One surface of the first carrying device 11 dents inwards to form an accommodating space 110. One end of the first carrying device 11 is pivotally disposed with an imaging assembly 111, and the other end of the first carrying device 11 is pivotally disposed with a virtual-image imaging assembly 112. One surface of the second carrying device 12 dents inwards to form a storage space 120. Here, when the image device 10 is detachably coupled to the accommodating space 110 and triggered, the image device 10 transforms the external image 2 into a reversed image message 100 and projects it to the imaging assembly 111. Then, the virtual-image imaging assembly 112 maps the reversed image message 100 of the imaging assembly 111 so as to produce a first image 102. When the image device 10 is detachably coupled to the storage space 120, the image device 10 projects the external image message 2 to a target 4 so as to produce a second image 103.

To be precise, the portable image device 10 of the image displaying system 1 of the present disclosure is selectively disposed on the first carrying device 11 or the second carrying device 12 to display the first image 102 pertaining to the driving assistance information such as the vehicle speed, fuel level, and the like, or the message of a handheld device, or alternatively to display the second image 103 pertaining to internet content, video, audio, and so on. Therefore, the application of image device 10 is not limited to vehicle, making the image device 10 as versatile as a portable image device. The image displaying system 1 includes the image device 10, the first carrying device 11 and the second carrying device 12. The image device 10 may be a laser projector, having the virtue of projecting images without having to adjust the focus once the throw distance is within the projection range. The image device 10 is applied to receive the external image message 2. The first carrying device 11 may be a carrying case and disposed on the control panel of the vehicle. One surface of the first carrying device 11 dents inwards to form the accommodating space 110, so that the image device 10 can be coupled thereto. The imaging assembly 111 and the virtual-image imaging assembly 112 are pivotally disposed on respective ends of the first carrying device 11. The second carrying device 12 may be a carrying case as well. One surface of the second carrying device 12 dents inwards to form the storage space 120, so that the image device 10 can be coupled thereto. Here, the second carrying device 12 facilitates user to enjoy the audio-visual content at anytime and anywhere. The present embodiment illustrates home theater system as an exemplary embodiment, but it shall be not limited thereto.

The image device 10 can be disposed on the first carrying device 11 to receive the external image message 2 pertaining to the driving assistance information transmitted by the electronic control unit of the vehicle or the information of the handheld device. Next, upon receiving a trigger, the image device 10 transforms the external image message 2 into the reversed image message 100 and then projects it to the imaging assembly 111. Here, the trigger may come from a mechanical switch or any form of sensor. Subsequently the virtual-image imaging assembly 112 maps the reversed image message 100 of the imaging assembly 111 to produce the first image 102 containing driving assistance information such as the vehicle speed, and fuel level, and so on, or the information of the handheld device. Here, the image device 10 of the image displaying system 1 of the present disclosure automatically identifies the nature of external image message 2 to provide the driving assistance information or the information of the handheld device. Besides, the imaging assembly 111 of the present disclosure is facing away from the user, so the reversed image message 100 projected to the imaging assembly 111 by the image device 10 is a reversion version of the first image 102. It is noteworthy that when the image device 10 of the present disclosure is disposed on the first carrying device 11 and operates in car mode, the virtual image of the first image 102 produced by the virtual-image imaging assembly 112 does not obstruct the front visional line of the vehicle to the user, so as to provide the driver with driving safety. In addition, the virtual image of the first image 102 is not affected by sunlight.

When the user leaves the vehicle, he/she can detach the image device 10 from the first carrying device 11. If the user wants to watch a movie or TV program at home, he/she can dispose the image device 10 on the second carrying device 12, such that the image device 10 can receive the external image message 2 related to movies or TV programs provided by the home theater equipment, play the internet content via internet connection, or play multimedia contents via connection device. The image device 10 then projects the content onto the target 4 such as a projection screen to display the second image 103 to the user.

Furthermore, when the image device 10 is detachably coupled to the storage space 120 and projects the external image message 2, a bottom line A of a projection range 20 where the image device 10 projects the external image message 2 is parallel to the other surface of the second carrying device 12 so as to prevent the projection image from being blocked.

That is to say, when the image device 10 is disposed on the carrying device 12 to project the external image message 2, the bottom line A of the projection range 20 where the external image message 2 is projected is parallel to the opposite surface of the second carrying device 12. In other words, when the second carrying device 12 is placed on the surface of table or any other object for the purpose of projecting external image message 2, the bottom line A of the projection range 20 where the external image message 2 is projected is parallel to the surface of table or any other object where the second carrying device 12 is being placed on. Hence, when the image device 10 is disposed on the second carrying device 12 to project image, the lower part of the projection range 20 where the external image message 2 is projected will not be projected onto the surface of the table or any other object where the second carrying device 12 is being placed on, so that the eternal image message 2 is not blocked and the user can have full view of the image.

It is noteworthy that when the image device 10 is disposed on the second carrying device 12, the image device 10 automatically corrects the image projection area of the second image 103 to avoid keystone effect. Namely, the image projection area of the conventional projector has a trapezoidal shape, i.e. wider upper part and narrower lower part. When projecting the external image message 2, the image device 10 of the present disclosure automatically corrects the image projection area, such that the second image 103 is in the shape of a rectangle instead of a trapezoid.

In addition, in another aspect of the image device 10 of the present disclosure, a sensor is applied to automatically determine the user status to adjust the information correspondingly, so as to achieve the human-centered design.

Figure 4:
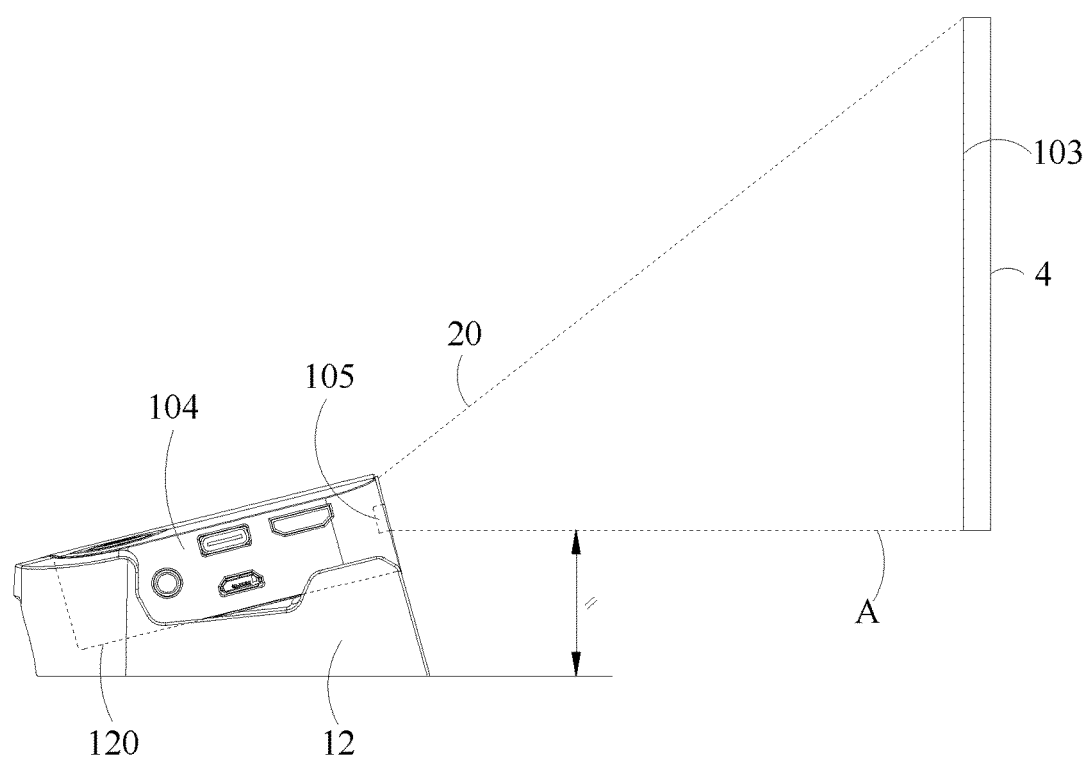
FIG. 4 is a schematic diagram illustrating the structure of the second embodiment of an image displaying system of the present disclosure.

Referring to FIG. 4, which is a schematic diagram illustrating the structure of the second embodiment of an image displaying system of the present disclosure. Reference should be made along with FIG. 1, FIG. 2, and FIG. 3 together. As shown in the figures, similar elements in the image displaying system of the present embodiment and that of the former embodiment operate in similar fashion. Hence, the unnecessary details are no longer given herein. It is noteworthy that the image device 10 applied in the present embodiment includes a device main body 104, an image assembly 105 and a control assembly 106. The image assembly 105 is disposed at one end of the device main body 104. The control assembly 106 is disposed in the device main body 104 and electrically connected to the image assembly 105. The control assembly 106 receives the external image message 2. Wherein, when the device main body 104 is detachably coupled to the accommodating space 110 and the control assembly 106 is triggered, the control assembly 106 transforms the external image message 2 into the reversed image message 100 and controls the image assembly 105 to project the reversed image message 100 onto the imaging assembly 111. Afterwards, the virtual-image imaging assembly 112 maps the reversed image message 100 of the imaging assembly 111 to produce the first image 102. When the device main body 104 is detachably coupled to the storage space 120, the control assembly 106 controls the image assembly 105 to project the external image message 2 onto the target 4 to produce the second image 103.

For example, the image device 10 of the present disclosure includes the device main body 104, the image assembly 105 and the control assembly 106. The device main body 104 may be a housing structure. One end of the device main body 104 is disposed with the image assembly 105 such as a laser projection lens, and the control assembly 106 is disposed inside the device main body 104. The control assembly 106 is electrically connected to the image assembly 105. When the device main body 104 is disposed in the accommodating space 110 of the first carrying device 11 and the control assembly 106 is activated by a trigger, the control assembly 106 transforms the external image message 2 into the reversed image message 100 which is then projected onto the imaging assembly 111 via image assembly 105. The reversed image message 100 may be a mirrored image of the external image message 2. Here, the trigger may come from a mechanical switch or any form of sensor. The virtual-image imaging assembly 112 subsequently maps the reversed image 100 of the imaging assembly 111 to produce the first image 102 related to the driving assistance information. Here, the image displaying system 1 of the present disclosure automatically identifies the nature of information through the control assembly 106 to provide information related to the driving assistance or the handheld device.

When the user disposes the device main body 104 in the storage space 120 of the second carrying device 12, the image device 10 projects the external image message 2 concerning the movie or TV program provided by the home video equipment onto the target 4 such as a projection screen, so as to project such content as the second image 103 for the viewing pleasure of the user.

Specifically, the image device 10 preferably includes at least one transmission element 107. The transmission element 107 is disposed at one side of the device main body 104 and electrically connected to the control assembly 106. The image device 10 is electrically connected to an external electronic device 5 through the at least one transmission element 107, so as to receive the external image message 2. That is, the image device 10 is disposed with at least one transmission element 107 which may conform to transmission interface such as the HDMI, MHL, USB 2.0 (3.0 included), or any other transmission interface known to those skilled in the art. The at least one transmission element 107 is electrically connected to the control assembly 106, such that when the user disposes the image device 10 on the first carrying device 11, the image device 10 is connected to the external electronic device 5, e.g. the electronic control unit or the handheld device, through the transmission element 107 to receive the external image message 2 from the external electronic device 5. When the image device 10 is disposed on the second carrying device 12, the image device 10 is connected to the external electronic device 5, such as a second video equipment, through the transmission element 107 to receive the external image message 2 transmitted by the external electronic device 5. Here, the transmission element 107 may be connected to the external electronic device 5 in the form of wired connection, e.g. USB, HDMI, MHL or other similar transmission method known to those skilled in the art, or wireless connection, e.g. Wi-Fi, Bluetooth, or other similar transmission method known to those skilled in the art.

To be precise, the image device 10 more preferably includes a power component 108. The power component 108 is disposed in the device main body 104 and electrically connected to the control assembly 106 and the image assembly 105. The power component 108 receives or stores an external power source 7 to supply power to the control assembly 106 and the image assembly 105. That is to say, the image device 10 of the present disclosure further includes the power component 108, which could be a rechargeable battery. The image device 10 is further connected to an external power supply terminal such as the electric supply, vehicle battery, power bank, or any other external power sources, by the power component 108 to receive or store the external power source 7 from the external power supply terminal. The power component 108 subsequently supplies the stored or received external power source 7 to the control assembly 106 and the image assembly 105.

Figure 5:
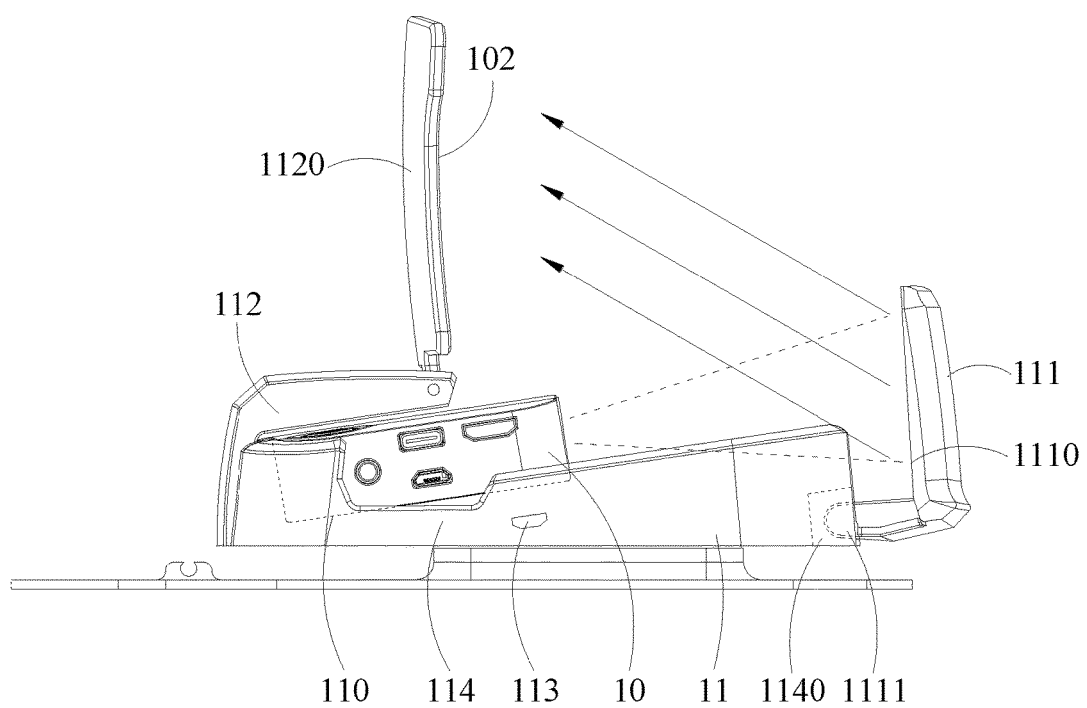
FIG. 5 is a schematic diagram illustrating the first structure of the third embodiment of an image displaying system of the present disclosure.
Figure 6:
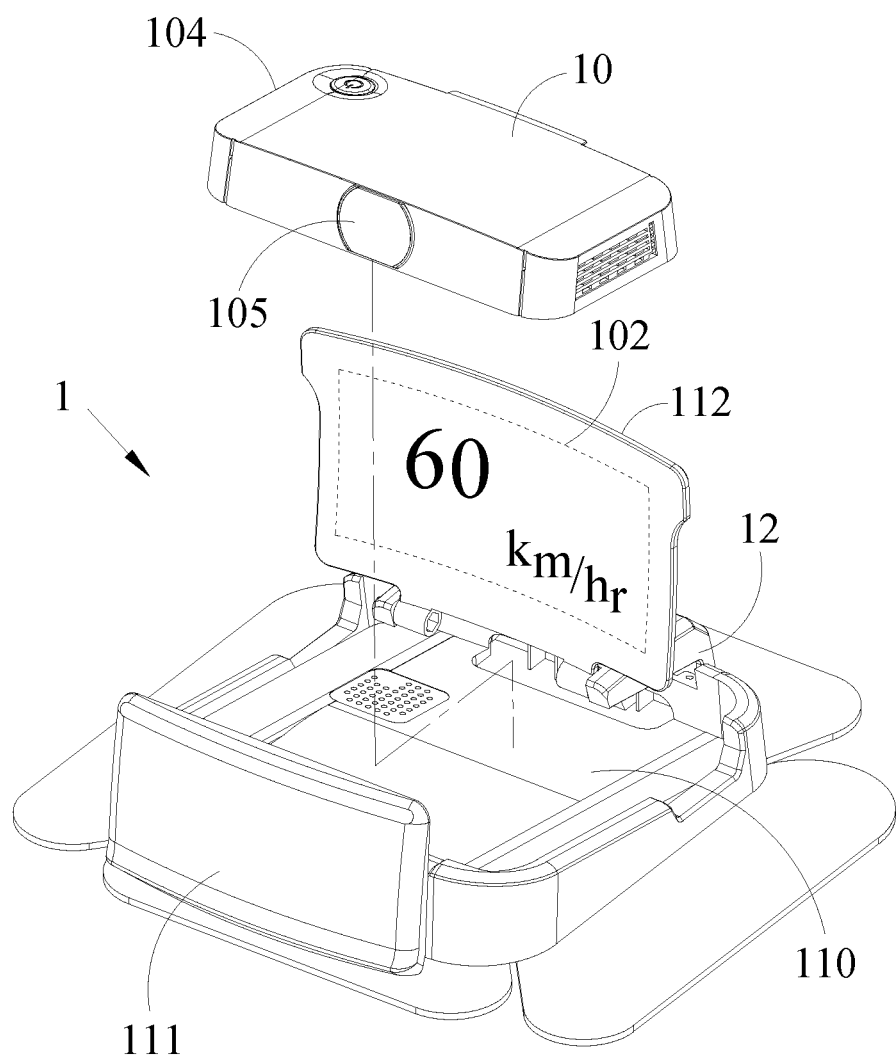
FIG. 6 is a schematic diagram illustrating the second structure of the third embodiment of an image displaying system of the present disclosure.
Figure 7:
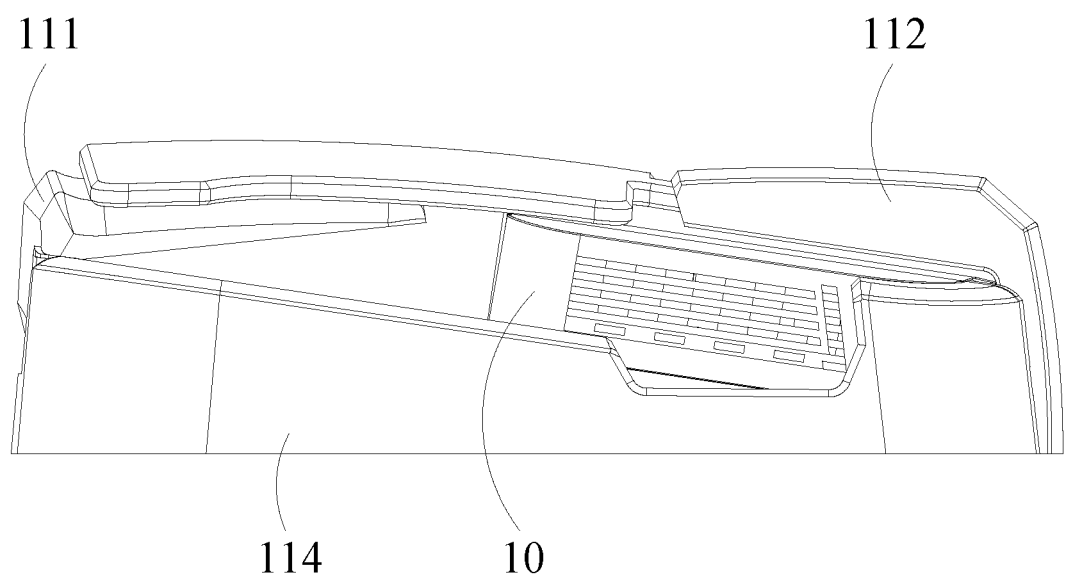
FIG. 7 is a schematic diagram illustrating the third structure of the third embodiment of an image displaying system of the present disclosure.

FIG. 5, FIG. 6 and FIG. 7 are a schematic diagram illustrating the first structure of the third embodiment of an image displaying system of the present disclosure, a schematic diagram illustrating the second structure of the third embodiment of an image displaying system of the present disclosure, and a schematic diagram illustrating the third structure of the third embodiment of an image displaying system of the present disclosure, respectively. Reference should be made along with FIG. 1 through FIG. 4, too. As shown in the figures, similar elements in the image displaying system of the present embodiment and that of the former embodiment operate in similar fashion. Hence, the unnecessary details are no longer given herein. It is noteworthy that the first carrying device 11 applied in the present embodiment includes a bearing base 114, an imaging plane 1110 and a display element 1120. One surface of the bearing base 114 dents inwards to form the accommodating space 110. An end of the bearing base 114 partially dents inwards, so that two inner walls at the end of the bearing base 114 respectively form a connecting part 1140. The imaging plane 1110 is disposed on the surface of the imaging assembly 111 that faces the bearing base 114. The surface of the imaging assembly 111 protrudes outwardly to form an engagement part 1111. The imaging assembly 111 is pivotally connected to both of the connecting parts 1140 through the engagement part 1111. A display element 1120 is pivotally disposed on one end of the virtual-image imaging assembly 112. The other end of the virtual-image imaging assembly 112 is pivotally connected to the bearing base 114. When the device main body 104 is detachably coupled to the accommodating space 110 and the control assembly 106 is triggered, the control assembly 106 transforms the external image message 2 into the reversed image message 100 and controls the image assembly 105 to project the reversed image 100 onto the imaging plane 1110 of the imaging assembly 111. Subsequently, the display element 1120 of the virtual-image imaging assembly 112 maps the reversed image message 100 of the imaging plane 1110 so as to produce the first image 102.

Specifically, the first carrying device 11 of the present disclosure includes the bearing base 114, the imaging plane 1110 and the display element 1120. The bearing base 114 may be a bearing case structure. One surface of the bearing base 114 dents inwards to form the accommodating space 110 to accommodate the image device 10. One end of the bearing base 114 is disposed with the connecting part 1140, and the connecting part 1140 is pivotally connected with the engagement part 1111 of the imaging assembly 111. One surface of the imaging assembly 111 is disposed with the imaging plane 1110 to receive the reversed image message 110 projected by the image device 10. One end of the virtual-image imaging assembly 112 is pivotally connected to the bearing base 114, while the other end of the virtual-image imaging assembly 112 is pivotally disposed with the display element 1120 for the purpose of mapping the reversed image message 100 of the imaging plane 1110, so as to produce the first image 102. Hence, when the device main body 104 is disposed in the accommodating space 110 of the bearing base 114 and the control assembly 106 is triggered, the control assembly 106 transforms the external image message 2 into the reversed image message 100 and controls the image assembly 105 to project the reversed image message 100 to the imaging plane 1110 of the imaging assembly 111. Afterwards the display element 1120 of the virtual-image imaging assembly 112 maps the reversed image message 100 of the imaging plane 1110 to display the first image 102 pertaining to the driving assistance information such as vehicle speed, and fuel level, and so on, or the information of the handheld device, providing the user with information about the driving condition.

Moreover, the first carrying device 11 is disposed with a magnetic element 113, and the control assembly 106 includes a magnetic switch 1060 and an image processing unit 1061. The magnetic switch 1060 is disposed in the device main body 104. The image processing unit 1061 is electrically connected to the image assembly 105 and the magnetic switch 1060. When the device main body 104 is detachably coupled to the accommodating space 110 and the magnetic switch 1060 is triggered by the magnetic element 113, the magnetic switch 1060 produces a trigger signal 1060A. Under the instruction of trigger signal 1060A, the image processing unit 1061 transforms the external image message 2 into the reversed image message 100 and controls the image assembly 105 to project the reversed image message 100 to the imaging assembly 111. Then the virtual-image imaging assembly 112 maps the reversed image message 100 of the imaging assembly 111 to produce the first image 102.

For example, the first carrying device 11 of the present disclosure further includes the magnetic element 113, and the control assembly 106 also further includes the magnetic switch 1060 and the image processing unit 1061. The magnetic switch 1060 and the image processing unit 1061 are disposed in the device main body 104. The image processing unit 1061 is electrically connected to the image assembly 105 and the magnetic switch 1060. When the device main body 104 is detachably coupled the accommodating space 110, the magnetic switch 1060 will sense the magnetic field of the magnetic element 113 and hence triggered, producing the trigger signal 1060A. Afterwards, the image processing unit 1061 transforms the external image message 2 into the reversed image message 100 according to the trigger signal 1060A and controls the image assembly 105 to project the reversed image message 100 to the imaging assembly 111. Then the virtual-image imaging assembly 112 maps the reversed image message 100 of the imaging assembly 111 to produce the first image 102 containing the driving assistance information about vehicle speed, and fuel level, and so on, or the information of the handheld device.

Furthermore, for storage, the imaging assembly 111 may pivot around the engagement part 1111 and the virtual-image imaging assembly 112 may pivot around the other end of the bearing base 114, until the imaging assembly 111 is parallel to the bearing base 114 and the virtual-image imaging assembly 112 is partially parallel to the bearing base 114, such that the bearing base 114, the imaging assembly 111 and the virtual-image imaging assembly 112 enclose the image device 10. For example, when the user would like to store the image device 10 in the first carrying device 11, the imaging assembly 111 and the virtual-image imaging assembly 112 can be folded onto the bearing base 114. In other words, the imaging assembly 111 pivots around the engagement part 1111 to reach a position which is parallel to the bearing base 114 in order to cover the bearing base 114, while the virtual-image imaging assembly 112 also pivots around the other end of the bearing base 114 to reach a position which is partially parallel to the bearing base 114 in order to cover the bearing base 114. Finally, the bearing base 114, the imaging assembly 111 and the virtual-image imaging assembly 112 encloses the image device 10 for easy storage.

In each embodiment mentioned above, the virtual-image imaging assembly 112 may be an L-shaped structure, and the display element 1120 may be made of a translucent material.

While the means of specific embodiments in present invention has been described by reference drawings, numerous modifications and variations could be made thereto by those skilled in the art without departing from the original scope and spirit of the invention set forth in the claims. The modifications and variations should in a range limited by the specification of the present invention.

What is claimed is:

1. An image displaying system, comprising:
an image device receiving an external image message, the image device comprises:
  a device main body;
  an image assembly disposed at one end of the device main body; and
  a control assembly disposed in the device main body and electrically connected to the image assembly, and the control assembly receiving the external image message;
  a first carrying device including an imaging assembly pivotally disposed at one end and a virtual-image imaging assembly pivotally disposed at an opposite end, the first carrying device comprising:
    a bearing base with a surface dents inwards to form an accommodating space, wherein an end of the bearing base partially dents inwards and two inner walls at the end of the bearing base respectively form a connecting part;
    an imaging plane disposed on a surface of the imaging assembly facing the bearing base, wherein the surface of the imaging assembly protrudes outwardly to form an engagement part and the imaging assembly is pivotally connected to both of the connecting parts through the engagement part; and
    a display element pivotally disposed on one end of the virtual-image imaging assembly, wherein another end of the virtual-image imaging assembly is pivotally connected to the bearing base; and
  a second carrying device with one surface denting inwards to form a storage space;
wherein, when the device main body is detachably coupled to the accommodating space and the control assembly is triggered, the control assembly transforms the external image message into a reversed image message and then controls the image assembly to project the reversed image message to the imaging plane, and the virtual-image imaging assembly maps the reversed image message of the imaging plane so as to produce a first image; alternatively when the device main body is detachably coupled to the storage space, the control assembly controls the image assembly to project the external image message to a target so as to produce a second image.

2. The image displaying system of claim 1, wherein when the image device is detachably coupled to the storage space and projects the external image message, a bottom line of a projection range where the image device projects the external image message is parallel to an opposite surface of the second carrying device.

3. The image displaying system of claim 1, wherein the image device further comprises at least one transmission element disposed at one side of the device main body and electrically connected to the control assembly, and the image device is electrically connected to an external electronic device through the at least one transmission element to receive the external image message.

4. The image displaying system of claim 1, wherein the imaging device further comprises a power component disposed in the device main body and electrically connected to the control assembly and the image assembly, and the power component receives or stores an external power source for supplying the control assembly and the image assembly with power.

5. The image displaying system of claim 1, wherein the first carrying device is disposed with a magnetic element and the control assembly comprises:
   a magnetic switch disposed in the device main body; and
   an image processing unit electrically connected to the image assembly and the magnetic switch;
   wherein, when the device main body is detachably coupled to the accommodating space, the magnetic switch is triggered by the magnetic element and produces a trigger signal, the image processing unit transforms the external image message into the reversed image message according to the trigger signal and controls the image assembly to project the reversed image message onto the imaging assembly, and then the virtual-image imaging assembly maps the reversed image message of the imaging assembly so as to produce the first image.

6. The image displaying system of claim 1, wherein for storage, the imaging assembly is able to pivot around the engagement part and the virtual-image imaging assembly is able to pivot around the other end of the bearing base, until the imaging assembly is parallel to the bearing base, and the virtual-image imaging assembly is partially parallel to the bearing base, such that the bearing base, the imaging assembly and the virtual-image imaging assembly enclose the image device.

7. The image displaying system of claim 1, wherein the virtual-image imaging assembly is in an L-shaped structure.

8. The image displaying system of claim 1, wherein the display element is made of a translucent material.

* * * * *